(12) United States Patent
Noguchi et al.

(10) Patent No.: US 10,208,835 B2
(45) Date of Patent: Feb. 19, 2019

(54) SPEED REDUCER

(71) Applicant: AISIN SEIKI KABUSHIKI KAISHA, Kariya-shi (JP)

(72) Inventors: Masao Noguchi, Kariya (JP); Toshiaki Nagata, Chita-gun (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 52 days.

(21) Appl. No.: 15/628,026

(22) Filed: Jun. 20, 2017

(65) Prior Publication Data
US 2017/0363176 A1    Dec. 21, 2017

(30) Foreign Application Priority Data
Jun. 20, 2016    (JP) .................................. 2016-121835

(51) Int. Cl.
| F16H 1/16 | (2006.01) |
| F16H 1/32 | (2006.01) |
| H02K 7/116 | (2006.01) |

(52) U.S. Cl.
CPC ................ F16H 1/32 (2013.01); F16H 1/16 (2013.01); H02K 7/1166 (2013.01)

(58) Field of Classification Search
CPC ..... F16H 1/32; F16H 1/16; F16H 1/28; F16H 1/46; H02K 7/1166; H02K 5/04; H02K 7/116
See application file for complete search history.

(56) References Cited

U.S. PATENT DOCUMENTS

| 8,777,794 B2 | 7/2014 | Oishi | |
| 2007/0209857 A1* | 9/2007 | Wolf | B60N 2/0232 180/315 |
| 2013/0109526 A1* | 5/2013 | Oishi | H02K 5/04 475/149 |

FOREIGN PATENT DOCUMENTS

| CN | 203686077 U | 7/2014 |
| JP | 5801692 | 10/2015 |

* cited by examiner

*Primary Examiner* — Ramya P Burgess
*Assistant Examiner* — Lillian T Nguyen
(74) *Attorney, Agent, or Firm* — Oblon, McClelland, Maier & Neustadt, L.L.P.

(57) ABSTRACT

A speed reducer includes: a case; an input shaft rotationally driven by an electric motor and having an eccentric shaft portion; an externally toothed gear wheel rotatably supported on the eccentric shaft portion; an output shaft rotatably supported on the case coaxially with the input shaft and having an internally toothed gear wheel; a guide plate formed with a guide recess recessed parallel to the input shaft, and disposed between the input shaft and the externally toothed gear wheel; a guide protrusion provided in the case to protrude parallel to the input shaft to guide sliding of the recess; and a guide portion provided between the externally toothed gear wheel and the guide plate to guide movement of the externally toothed gear wheel relative to the guide plate, thereby guiding the externally toothed gear wheel so as to be revolvable but non-rotatable in cooperation with the recess and the protrusion.

10 Claims, 3 Drawing Sheets

SPEED REDUCER

CROSS REFERENCE TO RELATED APPLICATIONS

This application is based on and claims priority under 35 U.S.C. § 119 to Japanese Patent Application 2016-121835, filed on Jun. 20, 2016, the entire contents of which are incorporated herein by reference.

TECHNICAL FIELD

This disclosure relates to a hypocycloid type speed reducer.

BACKGROUND DISCUSSION

In the related art, various types of speed reducers have been proposed (see, e.g., JP Patent No. 5801692B (Reference 1) and CN Utility Model No 203686077 (Reference 2)). The speed reducer disclosed in Reference 1 includes a case having a case body and a case cover, which are formed of a resin material, an input shaft (a worm wheel or a metal member), which is rotationally driven by an electric motor and has an eccentric shaft portion that is eccentric to an axis of the input shaft, an externally toothed gear wheel (gear plate), which is rotatably supported on the eccentric shaft portion, and an output shaft, which is rotatably supported on the case to be coaxial with the input shaft and has an internally toothed gear wheel having a number of teeth. The number of teeth in the output shaft is larger than the number of teeth of the externally toothed gear wheel, and the output shaft is engaged with the externally toothed gear wheel. In addition, a guide plate is disposed between the input shaft and the externally toothed gear wheel to guide the externally toothed gear wheel in such a manner that the externally toothed gear wheel is revolvable but non-rotatable.

That is, the case is formed with a pair of first guide recesses disposed at an interval of 180° around the output shaft, and the guide plate is provided with a pair of first guide protrusions, which are slidably inserted into the pair of first guide recesses, respectively. That is, since the first guide protrusions are inserted into the first guide recesses, sliding of the guide plate is guided in a first radial direction that is centered on the output shaft.

In addition, the guide plate is formed with a pair of second guide recesses, which are disposed at an interval of 180° around the externally toothed gear wheel to have an angle of 90° with respect to the pair of first guide protrusions, respectively. In the externally toothed gear wheel, a pair of second guide protrusions are provided to protrude so as to be slidably inserted into the pair of second guide recesses, respectively. That is, since the second guide protrusions are inserted into the second guide recesses, the sliding of the externally toothed gear wheel is guided in a second radial direction that is centered on the externally toothed gear wheel. Of course, the first and second radial directions are orthogonal to each other.

Accordingly, when the eccentric shaft portion (the input shaft) rotates, the externally toothed gear wheel revolves while moving in the first and second radial directions through the guide plate. In addition, when the externally toothed gear wheel makes one turn (revolution), the engagement portion engaged with the internally toothed gear wheel makes one turn, so that the internally toothed gear wheel (the output shaft) rotates by the difference in the number of teeth between the externally toothed gear wheel and the internally toothed gear wheel. Thereby, the rotation of the input shaft is sufficiently reduced in speed and is transmitted to the output shaft.

In particular, in Reference 1, a pair of fitting protrusions, which are disposed at an interval of 180° respectively to conform to the pair of first guide recesses, protrude from the surface of the case cover opposite the case body, and fitting recesses, into which the pair of fitting protrusions are respectively fitted, are formed in the surface of the case body opposite the case cover. Each fitting protrusion is formed so as to surround the corresponding first guide recess (and the first guide protrusion). In addition, the case (the case body and the case cover) is formed with a device hole for mounting a collar through which a bolt for fastening with a member to be attached is inserted. In addition, it has been proposed to dispose the device hole in the direction in which the guide plate is to rotate when an external load is reversely input from the output shaft in the vicinity of the fitting region of the fitting protrusions and the fitting recesses. Thereby, the external load reversely input from the output shaft is transmitted from the first guide protrusions of the guide plate to the fitting region of the fitting protrusions and the fitting recesses through the first guide recesses, and is distributed to the case body and the case cover. In addition, the external load transmitted to the case body and the case cover is transmitted to the member to be attached through the collar and the bolt.

In this way, it is possible to suppress the excessive load, which is reversely input from the output shaft, from being applied to the case body and the case cover, which are formed of a resin material.

In Reference 1, because stress concentrates on a cantilever-supported root portion of the first guide protrusion when the first guide recess, into which the first guide protrusion is inserted, receives the external load reversely input from the output shaft, a strength is required for the guide plate itself.

Thus, a need exists for a speed reducer which is not susceptible to the drawback mentioned above.

SUMMARY

A speed reducer according to an aspect of this disclosure includes: a case; an input shaft configured to be rotationally driven by an electric motor and having an eccentric shaft portion that is eccentric to an axis of the input shaft; an externally toothed gear wheel rotatably supported on the eccentric shaft portion; an output shaft rotatably supported on the case to be coaxial with the input shaft and having an internally toothed gear wheel, which has teeth more than teeth of the externally toothed gear wheel and is engaged with the externally toothed gear wheel; a guide plate formed with a guide recess that is recessed parallel to the axis of the input shaft, and disposed between the input shaft and the externally toothed gear wheel; a guide protrusion provided in the case to protrude parallel to the axis of the input shaft so as to be inserted into the guide recess, and configured to guide sliding of the guide recess in a first radial direction that is centered on the output shaft; and a guide portion provided between the externally toothed gear wheel and the guide plate to guide movement of the externally toothed gear wheel relative to the guide plate in a second radial direction that crosses with the first radial direction about the externally toothed gear wheel as a center, thereby guiding the externally toothed gear wheel so as to be revolvable but non-rotatable in cooperation with the guide recess and the guide protrusion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a speed reducer will be described.

Figure 1:
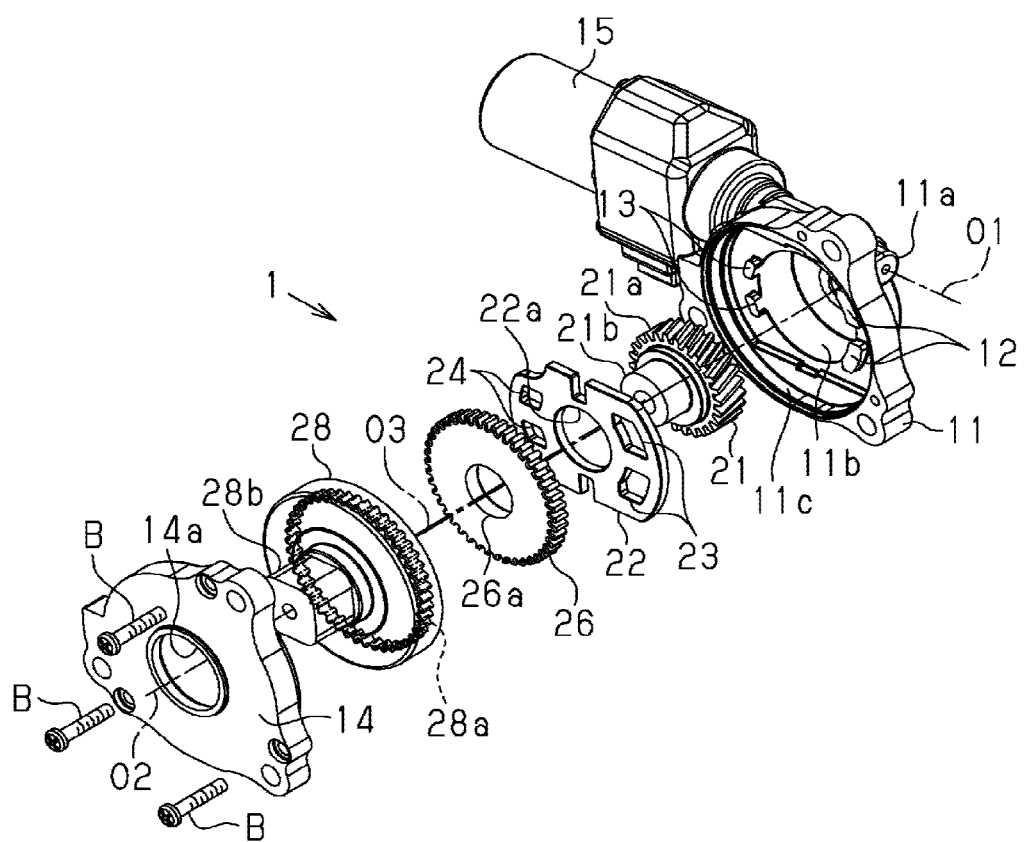
FIG. 1 is an exploded perspective view illustrating the structure of a speed reducer according to an embodiment.

As illustrated in FIG. 1, a housing 11, which forms the case of a speed reducer 1, includes a capped and substantially cylindrical worm housing portion 11a, a center line O1 of which extends in a direction (in a right downward diagonal direction in the drawing), and a bottomed and substantially cylindrical wheel housing portion 11b, a center line O2 of which extends in a direction orthogonal to the center line O1 (in a left downward diagonal direction in the drawing). The inner diameter of the wheel housing portion 11b is set to be larger than the inner diameter of the worm housing portion 11a. In addition, the worm housing portion 11a and the wheel housing portion 11b are in communication with each other because the overlapped outer circumferential portions thereof are cut out. In addition, the housing 11 includes a bottomed and substantially cylindrical gear housing portion 11c, which is connected with the opening end of the wheel housing portion 11b to be coaxial with the wheel housing portion 11b. The inner diameter of the gear housing portion 11c is set to be larger than the inner diameter of the wheel housing portion 11b.

Figure 2:
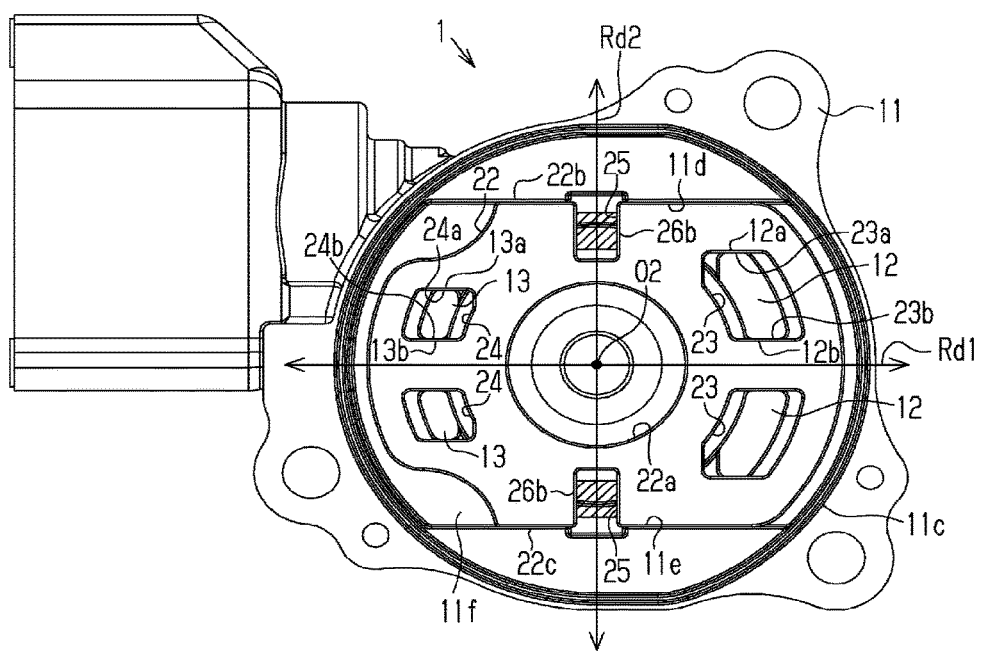
FIG. 2 is a front view illustrating the structure of the speed reducer according to the embodiment.

In addition, as illustrated in FIG. 2, the bottom portion of the gear housing portion 11c, which is connected to the wheel housing portion 11b is formed with a pair of steps 11d and 11e, which extends parallel to a first radial direction Rd1 that is centered on the center line O2. The pair of steps 11d and 11e are disposed on mutually opposite sides with respect to the center line O2, and the distances from the center line O2 to the pair of steps 11d and 11e are set to be equal to each other. In addition, the bottom portion of the gear housing portion 11c interposed between the pair of steps 11d and 11e forms a plate accommodating portion 11f, which is recessed by an amount of the pair of steps 11d and 11e.

In the plate accommodating portion 11f, first guide protrusions 12 as a pair of guide protrusions and second guide protrusions 13 as a pair of guide protrusions are provided to protrude from the peripheral edge portion of the wheel housing portion 11b parallel to the center line O2 (the axis of an input shaft). Both the first guide protrusions 12 are disposed on one side (the right side in FIG. 2) of the center line O2 in the first radial direction Rd1, and have a line-symmetrical shape about the first radial direction Rd1 when viewed along the center line O2. Each first guide protrusion 12 is formed in a substantially circular arc-wall shape about the center line O2 as a center, and opposite peripheral end surfaces thereof extend parallel to the first radial direction Rd1 and form guiding surfaces 12a and 12b, respectively. Similarly, both the second guide protrusions 13 are disposed on the other side (the left side in FIG. 2) of the center line O2 in the first radial direction Rd1, and have a line-symmetrical shape about the first radial direction Rd1 when viewed along the center line O2. Each second guide protrusion 13 is formed in a substantially arc-wall shape about the center line O2 as a center, and opposite peripheral end surfaces thereof extend parallel to the first radial direction Rd1 and form guiding surfaces 13a and 13b, respectively.

An electric motor 15 is mounted on the housing 11, and a worm (not illustrated), which is supported inside the worm housing portion 11a to be rotatable around an axis extending along the center line O1, is fixed to a rotating shaft of the electric motor 15 to integrally rotate with the rotating shaft. The worm is engaged with a worm wheel portion 21a of an input gear 21, which is an input shaft supported inside the wheel housing portion 11b to be rotatable around an axis extending along the center line O2. That is, the input gear 21 is rotated by the electric motor 15. In addition, the input gear 21 includes a substantially cylindrical eccentric shaft portion 21b, a center line O3 of which extends eccentrically to the axis (the center line O2) of the input gear.

A guide plate 22 formed of a resin material is mounted in the plate accommodating portion 11f of the housing 11. That is, the guide plate 22 has a substantially oval shape in which the outer circumferential portion of a disc having an outer diameter smaller than the inner diameter of the gear housing portion 11c is cut out along the pair of steps 11d (so-called width across flat shape). In addition, in the guide plate 22 a substantially circular through hole 22a is formed to face the eccentric shaft portion 21b and penetrate the central portion of the guide plate along the center line O2. In addition, in the guide plate 22, first guide recesses 23 as a pair of guide recesses are formed to face the first guide protrusions 12, respectively, and penetrate the outer circumferential portion of the guide plate parallel to the center line O2, and second guide recesses 24 as a pair of guide recesses are formed to face the second guide protrusions 13, respectively, and penetrate the outer circumferential portion of the guide plate parallel to the center line O2. Of course, both the first guide recesses 23 and both the second guide recesses 24 are opened parallel to the center line O2 (recessed parallel to the axis of the input shaft). The guide plate 22 is mounted in the plate accommodating portion 11f in a state where the eccentric shaft portion 21b is loosely fitted into the through hole 22a and both the first guide protrusions 12 and both the second guide protrusions 13 are inserted into both the first guide recesses 23 and both the second guide recesses 24, respectively. At this time, a pair of plate thickness surfaces 22b and 22c of the guide plate 22, which respectively extend along the steps 11d and 11e, are located close to the steps 11d and 11e, respectively.

Here, the inner diameter of the through hole 22a is set to open the movement path of the eccentric shaft portion 21b according to the rotation of the input gear 21. Each first guide recess 23 is formed in a substantially circular arc shape about the through hole 22a as a center, and opposite peripheral inner wall surfaces thereof extend parallel to the first radial direction Rd1 and form guided surfaces 23a and 23b, respectively. The peripheral dimension of each first guide recess 23 about the through hole 22a as a center is set to be equal to the peripheral dimension of the first guide protrusion 12 about the center line O2 as a center, and the dimension of each first guide recess 23 along the first radial direction Rd1 is set to be larger than the dimension of the first guide protrusion 12 along the first radial direction Rd1. Similarly, each second guide recess 24 is formed in a substantially circular arc shape about the through hole 22a as a center, and opposite peripheral inner wall surfaces thereof extend parallel to the first radial direction Rd1 and form guided surfaces 24a and 24b, respectively. The peripheral dimension of each second guide recess 24 about the through hole 22a as a center is set to be equal to the peripheral dimension of the second guide protrusion 13 about the center line O2 as a center, and the dimension of each second guide recess 24 along the first radial direction Rd1 is set to be larger than the dimension of the second guide protrusion 13 along the first radial direction Rd1.

Accordingly, the opposite guided surfaces 23a and 23b of the first guide recess 23 are slidable in contact with the opposite guiding surfaces 12a and 12b of the first guide protrusion 12, respectively, and the opposite guided surfaces 24a and 24b of the second guide recess 24 are slidable in contact with the opposite guiding surfaces 13a and 13b of the second guide protrusion 13, respectively. That is, the guide plate 22 is movable relative to the housing 11 along the first radial direction Rd1 while causing the first and second guide recesses 23 and 24 to be slid on the respective first and second guide protrusions 12 and 13. In other words, the first and second guide protrusions 12 and 13 guide the sliding of the first and second guide recesses 23 and 24 in the first radial direction Rd1. When the center of the through hole 22a coincides with the center line O2, the first guide protrusion 12 (the guiding surfaces 12a and 12b) is disposed at the center of the first guide recess 23 (the guided surfaces 23a and 23b) in the first radial direction Rd1. Similarly, the second guide protrusion 13 (the guiding surfaces 13a and 13b) is disposed at the center of the second guide recess 24 (the guided surfaces 24a and 24b) in the first radial direction Rd1.

In addition, the guide plate 22 is formed with a pair of substantially rectangular guide grooves 25, which are cut out from the opposite plate thickness surfaces 22b and 22c so as to approach each other in a second radial direction Rd2 that is centered on the through hole 22a. Of course, the second radial direction Rd2 is orthogonal to (crossing) the first radial direction Rd1.

Within the gear housing portion 11c, an externally toothed gear wheel 26 having a substantially cylindrical shape is accommodated in a state where the guide plate 22 is disposed between the externally toothed gear wheel and the worm wheel portion 21a (the input gear 21). The externally toothed gear wheel 26 is formed with a circular bearing hole 26a, which has an inner diameter equal to the outer diameter of the eccentric shaft portion 21b. When the eccentric shaft portion 21b is inserted into the bearing hole 26a, the externally toothed gear wheel 26 is rotatably supported around the eccentric shaft portion 21b.

In the externally toothed gear wheel 26, a pair of substantially rectangular column-shaped guide lugs 26b are provided to protrude parallel to the center line O2 and toward the guide plate 22 from opposite outer circumferential portions in the second radial direction Rd2 (for convenience, only the opposite guide lugs 26b are illustrated in FIG. 2). The dimension of each guide lug 26b in the first radial direction Rd1 is set to be equal to the opening width of the guide grooves 25, and the dimension of each guide lug 26b in the second radial direction Rd2 is set to be smaller than the opening width of the guide grooves 25. In addition, the guide lugs 26b are inserted into opposed guide grooves 25, respectively.

Accordingly, the externally toothed gear wheel 26 is movable relative to the guide plate 22 along the second radial direction Rd2 while causing each guide lug 26b to be slid in the corresponding guide groove 25. The guide lugs 26b and the guide grooves 25 guide the movement of the externally toothed gear wheel 26 relative to the guide plate 22 in the second radial direction Rd2, thereby guiding the externally toothed gear wheel 26 to be revolvable but non-rotatable in cooperation with the first and second guide recesses 23 and 24 and the first and second guide protrusions 12 and 13. The opposite guide lugs 26b and the opposite guide grooves 25 constitute a guide portion.

A cover 14, which forms the case of the speed reducer 1, is formed to conform to the peripheral edge portion of an opening in the gear housing portion 11c, and is fastened to the housing 11 by plural bolts B having an axis extending parallel to the center line O2. The cover 14 constitutes the case together with the housing 11. In addition, in the central portion of the cover 14, a substantially circular discharge hole 14a is formed about the center line O2 as a center.

An output member 28, which serves as an output shaft, is rotatably supported on the cover 14 coaxially with the input gear 21 in a state where the output member 28 is interposed between the cover 14 and the guide plate 22. The output member 28 has a capped and substantially cylindrical shape, which is opened toward the externally toothed gear wheel 26, and an internally toothed gear wheel 28a is formed over the entire inner circumferential portion of the output member. The internally toothed gear wheel 28a has teeth, the number of which is larger than the number of teeth of the externally toothed gear wheel 26, and is engaged with the externally toothed gear wheel 26. Accordingly, when the eccentric shaft portion 21b (the input gear 21) rotates, the externally toothed gear wheel 26 revolves while moving in the first radial direction Rd1 and the second radial direction Rd2 through the guide plate 22. In addition, when the externally toothed gear wheel 26 makes one turn (revolution), the engagement portion thereof with the internally toothed gear wheel 28a makes one turn, so that the internally toothed gear wheel 28a (the output member 28) rotates by the difference in the number of teeth between the externally toothed gear wheel 26 and the internally toothed gear wheel 28a. In addition, a substantially rectangular column-shaped output portion 28b, which is concentric with the internally toothed gear wheel 28a, is provided to protrude from the output member 28. The output portion 28b is loosely fitted into the discharge hole 14a to be connected to an appropriate driving target (not illustrated).

Next, the effects of the present embodiment will be described together with the actions thereof.

(1) In the present embodiment, when the eccentric shaft portion 21b (the input gear 21) rotates, the externally toothed gear wheel 26 revolves while moving in the first radial direction Rd1 and the second radial direction Rd2 through the guide plate 22. In addition, when the externally toothed gear wheel 26 makes one turn (revolution), the engagement portion thereof with the internally toothed gear wheel 28a makes one turn, so that the internally toothed gear wheel 28a (the output member 28) rotates by the difference in the number of teeth between the externally toothed gear wheel 26 and the internally toothed gear wheel 28a. Thereby, the rotation of the input gear 21 is sufficiently reduced in speed and is transmitted to the output member 28. Then, the aforementioned driving target connected to the output portion 28b of the output member 28 is driven with a sufficient torque.

Figure 3:
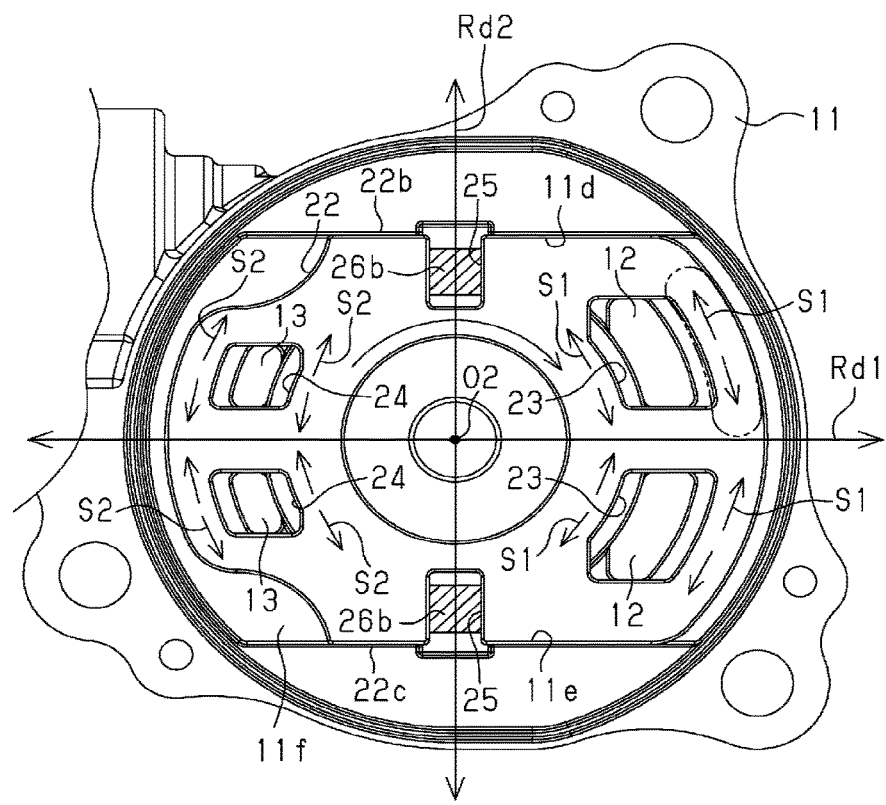
FIG. 3 is a front view illustrating the action of the speed reducer according to the embodiment.

Here, as illustrated in FIG. 3, when an external load is reversely input from the output member 28, the guide plate 22 is rotated, so that the external load is applied to the first and second guide protrusions 12 and 13, which are inserted into the first and second guide recesses 23 and 24, respectively. Then, a peripheral load about the externally toothed gear wheel 26 as a center is applied as reaction force to the external load to the first and second guide recesses 23 and 24. At this time, since the first and second guide recesses 23 and 24 surround the first and second guide protrusions 12 and 13 over the entire peripheries thereof, respectively, the reaction force generates tensile stresses S1 and S2 in the peripheral directions at the peripheral edge portions of the respective first and second guide recesses 23 and 24, and for example, stress concentration as in the case of a cantilever support is eliminated. Thereby, the strength required for the guide plate 22 against the external load may further be reduced.

(2) In the present embodiment, the guide plate 22 has a pair of plate thickness surfaces 22b and 22c, which extend parallel to the first radial direction Rd1, and the housing 11 is formed with a pair of steps 11d and 11e, which are capable of being in contact with the opposite plate thickness surfaces 22b and 22c, respectively. Therefore, for example, when an excessive external load is reversely input from the output member 28, the first and second guide recesses 23 and 24 may be deformed by the reaction force applied from the first and second guide protrusions 12 and 13 to the respective first and second guide recesses 23 and 24. At this time, since the plate thickness surfaces 22b and 22c are contact with the steps 11d and 11e, the steps 11d and 11e are also capable of bearing the external load. Thereby, the strength required for the guide plate 22 against the reversely input external load may further be reduced.

(3) In the present embodiment, the guide plate 22 is formed of a resin material, and as a result, the mass and costs may be reduced compared to a case where the guide plate 22 is formed of, for example, a metal. In addition, since the guide plate 22 and the housing 11 (e.g., the plate accommodating portion 11f) are in a resin-to-resin sliding relationship, the management of the sliding portion may further be simplified and the cost may be reduced.

(4) In the present embodiment, the opposite guided surfaces 23a and 23b (straight portions), which extend parallel to the first radial direction Rd1, are respectively slid on the opposite guiding surfaces 12a and 12b (straight portions), which also extend parallel to the first radial direction Rd1. Similarly, the opposite guided surfaces 24a and 24b (straight portions), which extend parallel to the first radial direction Rd1, are respectively slid on the opposite guiding surfaces 13a and 13b (straight portions), which also extend parallel to the first radial direction Rd1. Accordingly, the first and second guide protrusions 12 and 13 may more strongly bear the external load reversely input from the output member 28. In addition, the guide plate 22 may be suppressed from rattling in the rotational direction by the external load reversely input from the output member 28.

(5) In the present embodiment, since there are provided plural sets of guide protrusions and guide recesses, in which a guide protrusion and a guide recess (the first guide protrusion 12 and the first guide recess 23 or the second guide protrusion 13 and the second guide recess 24) form one set, the reaction force can be dispersed to plural guide recesses. In particular, by disposing the plural sets of guide protrusions and guide recesses in good balance in the peripheral edge portion of the through hole 22a, the reaction force can be more uniformly dispersed to the plural guide recesses. In addition, the movement of the guide plate 22 can further be stabilized along the first radial direction Rd1 by the plural sets of guide protrusions and guide recesses.

In addition, the embodiment may be modified as follows.

Figure 4A:
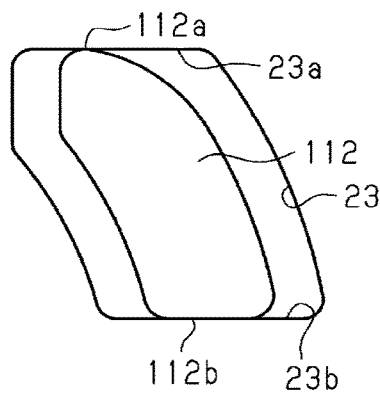
FIGS. 4A and 4B are front views illustrating the structure of a speed reducer according to a modification.

As illustrated in FIG. 4A, a first guide protrusion 112, which corresponds to the first guide protrusion 12 to be inserted into the first guide recess 23, may have a curved portion 112a, which comes into line contact with the first guide recess 23 (the guided surface 23a) and has a substantially circular arc surface shape, and may also have a guiding surface 112b which is the same as the guide surface 12b. In this case, since the curved portion 112a comes into line contact with the first guide recess 23, the first guide protrusion 112 can further stabilize the moving posture of the first guide recess 23 along the first radial direction Rd1. In addition, the first guide protrusion 112 may have a sharply curved portion so as to come into point contact with the first guide recess 23.

The first guide protrusion 112 may have a guiding surface which is the same as the guiding surface 12a and may also have a curved portion, which comes into line contact with the first guide recess 23 (the guided surface 23b) and has a substantially circular arc surface shape, or a sharply curved portion, which comes into point contact with the first guide recess. In addition, the same structure may also be adopted for the second guide protrusion 13 to be inserted into the second guide recess 24.

Figure 4B:
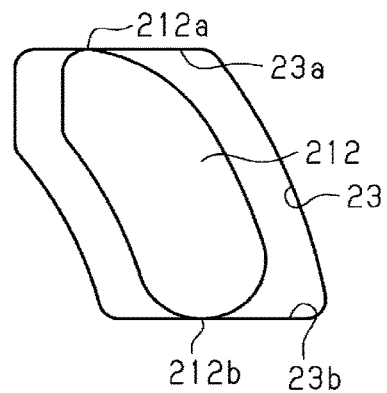

As illustrated in FIG. 4B, a first guide protrusion 212, which corresponds to the first guide protrusion 12 to be inserted into the first guide recess 23, may have a curved portion 212a, which comes into line contact with the first guide recess 23 (the guided surface 23a) and has a substantially circular arc surface shape, and may also have a curved portion 212b, which comes into line contact with the first guide recess 23 (the guided surface 23b) and has a substantially circular arc surface shape. In this case, although the first guide protrusion 212 comes into contact with the first guide recess 23 at two positions, the moving posture of the first guide recess 23 may further be stabilized along the first radial direction Rd1 since plural guide protrusions (the first guide protrusions 12 or the second guide protrusions 13) adopt the same structure. In addition, the first guide protrusion 212 may have a sharply curved portion, which comes into point contact with the first guide recess 23 (the guided surface 23a), and may also have a sharply curved portion, which comes into point contact with the first guide recess 23 (the guided surface 23b).

The same structure may be adopted for the second guide protrusions 13 to be inserted into the second guide recesses 24.

In the embodiment, the number of guide protrusions and guide recesses forming one set is arbitrary. For example, only one set of a guide protrusion and a guide recess may be provided as long as the moving posture of the guide plate 22 along the first radial direction Rd1 is not made unstable.

In the embodiment, the guide plate 22 may be formed of, for example, a metal.

In the embodiment, at least one of the steps 11d and 11e may be omitted. In this case, the plate thickness surfaces (22b and 22c), which have faced the omitted steps 11d and 11e, may need not to extend parallel to the first radial direction Rd1.

In the embodiment, the first guide recess 23 may have a non-through hole shape into which the first guide protrusion 12 may be inserted. Similarly, the second guide recess 24 may have a non-through hole shape into which the second guide protrusion 13 may be inserted.

In the embodiment, the guide plate 22 may have a line-symmetrical shape about the second radial direction Rd2 when viewed in the axial direction. That is, the second guide recess 24 (the second guide protrusion 13) and the first guide recess 23 (the first guide protrusion 12) may also be line-symmetrical about the second radial direction Rd2.

In the embodiment, the opposite guide lugs 26b of the externally toothed gear wheel 26 are respectively inserted into the opposite guide grooves 25 of the guide plate 22 to guide the movement of the externally toothed gear wheel 26 along the second radial direction Rd2. Alternatively, guide lugs, which correspond to the guide lugs 26b, may protrude from the guide plate 22, and guide grooves, which correspond to the guide grooves 25, may be formed on the externally toothed gear wheel 26. Even in this case, by inserting the guide lugs of the guide plate 22 into the guide grooves in the externally toothed gear wheel 26, the movement of the externally toothed gear wheel 26 is guided along the second radial direction Rd2.

In the embodiment, although the first radial direction Rd1 and the second radial direction Rd2 are set to be orthogonal to each other, the relationship thereof is arbitrary as long as they cross each other.

In the embodiment, the output member 28 may be rotatably supported by the housing 11 other than the cover 14.

Next, technical ideas, which may be grasped from the embodiment and other examples, will be additionally described below.

A speed reducer according to an aspect of this disclosure includes: a case; an input shaft configured to be rotationally driven by an electric motor and having an eccentric shaft portion that is eccentric to an axis of the input shaft; an externally toothed gear wheel rotatably supported on the eccentric shaft portion; an output shaft rotatably supported on the case to be coaxial with the input shaft and having an internally toothed gear wheel, which has teeth more than teeth of the externally toothed gear wheel and is engaged with the externally toothed gear wheel; a guide plate formed with a guide recess that is recessed parallel to the axis of the input shaft, and disposed between the input shaft and the externally toothed gear wheel; a guide protrusion provided in the case to protrude parallel to the axis of the input shaft so as to be inserted into the guide recess, and configured to guide sliding of the guide recess in a first radial direction that is centered on the output shaft; and a guide portion provided between the externally toothed gear wheel and the guide plate to guide movement of the externally toothed gear wheel relative to the guide plate in a second radial direction that crosses with the first radial direction about the externally toothed gear wheel as a center, thereby guiding the externally toothed gear wheel so as to be revolvable but non-rotatable in cooperation with the guide recess and the guide protrusion.

According to this configuration, when the eccentric shaft portion (the input shaft) rotates, the externally toothed gear wheel revolves while moving in the first radial direction and the second radial direction with the guide plate being interposed therebetween. In addition, when the externally toothed gear wheel makes one turn (revolution), the engagement portion thereof with the internally toothed gear wheel makes one turn, so that the internally toothed gear wheel (the output shaft) rotates by the difference in the number of teeth between the externally toothed gear wheel and the internally toothed gear wheel. Thereby, the rotation of the input shaft is sufficiently reduced in speed and is transmitted to the output shaft. Here, when an external load is reversely input from the output shaft, the guide plate is rotated, so that the external load is applied to the guide protrusion inserted into the guide recess. Then, a peripheral load about the externally toothed gear wheel as a center is applied to the guide recess as reaction force to the external load. At this time, since the guide recess surrounds the guide protrusion over the entire periphery thereof, the reaction force generates tensile stress in the peripheral direction at the peripheral edge portion of the guide recess, and for example, stress concentration as in the case of a cantilever support is eliminated. Thereby, the strength required for the guide plate against the reversely input external load may further be reduced.

In the speed reducer, it is preferable that the guide recess surrounds the guide protrusion over an entire periphery of the guide protrusion.

In the speed reducer, it is preferable that the guide plate includes a pair of plate thickness surfaces extending parallel to the first radial direction, and the case includes a pair of steps configured to come into contact with the pair of plate thickness surfaces, respectively.

According to this configuration, for example, when the external load reversely input from the output shaft is excessive and as a result, the guide recess is deformed by reaction force applied to the guide recess from the guide protrusion, the plate thickness surfaces may come into contact with the steps, whereby the external load may also be applied to the steps. Thereby, the strength required for the guide plate against the reversely input external load can further be reduced.

In addition, the term "plate thickness surface" refers to a side surface that intersects with a surface having a much larger area than the other surfaces of the guide plate (a so-called main surface (a main surface or a back surface)).

In the speed reducer, it is preferable that the guide plate includes a plate thickness surface extending in the first radial direction, and the case includes a step configured to come into contact with the plate thickness surface.

In the speed reducer, it is preferable that the guide protrusion includes a curved portion configured to come into line contact or point contact with the guide recess so as to guide sliding of the guide recess in the first radial direction.

According to this configuration, the guide protrusion may come into line contact or point contact the guide recess at the curved portion thereof, thereby further stabilizing the moving posture of the guide recess along the first radial direction.

In the speed reducer, it is preferable that the guide recess penetrates the guide plate parallel to the axis.

In the speed reducer, it is preferable that the guide protrusion includes a pair of guiding surfaces formed on an end surface thereof so as to extend parallel to the first radial direction, the guide recess includes a pair of guided surfaces formed on an inner wall surface thereof so as to extend parallel to the first radial direction, and the guide plate moves relative to the case in the first radial direction by causing the guided surfaces to come into contact with the guiding surfaces and to be slid.

In the speed reducer, it is preferable that the guide portion includes: a guide lug provided on the externally toothed gear wheel so as to protrude toward the guide plate parallel to the axis; and a guide groove provided in the guide plate by cutting out an end of the guide plate such that the guide lug is inserted into the guide groove.

In the speed reducer, it is preferable that the guide plate is formed of a resin material.

According to this configuration, since the guide plate 22 is formed of a resin material, the mass of the guide plate 22 can be reduced compared to a case where the guide plate 22 is formed of a metal, for example.

In the speed reducer, it is preferable that the reducer includes plural sets of the guide protrusions and the guide recesses, each of the sets including the guide protrusion and the guide recess as one set.

According to this configuration, since there are provided plural sets of guide protrusions and guide recesses, in which the guide protrusion and the guide recess forms one set, the reaction force can be distributed to the plural guide recesses.

The aspect of this disclosure has the effect of further reducing the strength required for the guide plate against the reversely input external load.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A speed reducer comprising:
   a case;
   an input shaft configured to be rotationally driven by an electric motor and having an eccentric shaft portion that is eccentric to an axis of the input shaft;
   an externally toothed gear wheel rotatably supported on the eccentric shaft portion;
   an output shaft rotatably supported on the case to be coaxial with the input shaft and having an internally toothed gear wheel, which has teeth more than teeth of the externally toothed gear wheel and is engaged with the externally toothed gear wheel;
   a guide plate formed with a guide recess that is recessed parallel to the axis of the input shaft, and disposed between the input shaft and the externally toothed gear wheel;
   a guide protrusion provided in the case to protrude parallel to the axis of the input shaft so as to be inserted into the guide recess, and configured to guide sliding of the guide recess in a first radial direction that is centered on the output shaft; and
   a guide portion provided between the externally toothed gear wheel and the guide plate to guide movement of the externally toothed gear wheel relative to the guide plate in a second radial direction that crosses with the first radial direction about the externally toothed gear wheel as a center, thereby guiding the externally toothed gear wheel so as to be revolvable but non-rotatable in cooperation with the guide recess and the guide protrusion.

2. The speed reducer according to claim 1,
   wherein the guide recess surrounds the guide protrusion over an entire periphery of the guide protrusion.

3. The speed reducer according to claim 1,
   wherein the guide plate includes a pair of plate thickness surfaces extending parallel to the first radial direction, and
   the case includes a pair of steps configured to come into contact with the pair of plate thickness surfaces, respectively.

4. The speed reducer according to claim 1,
   wherein the guide plate includes a plate thickness surface extending in the first radial direction, and
   the case includes a step configured to come into contact with the plate thickness surface.

5. The speed reducer according to claim 1,
   wherein the guide protrusion includes a curved portion configured to come into line contact or point contact with the guide recess so as to guide sliding of the guide recess in the first radial direction.

6. The speed reducer according to claim 1,
   wherein the guide recess penetrates the guide plate parallel to the axis.

7. The speed reducer according to claim 1,
   wherein the guide protrusion includes a pair of guiding surfaces formed on an end surface thereof so as to extend parallel to the first radial direction,
   the guide recess includes a pair of guided surfaces formed on an inner wall surface thereof so as to extend parallel to the first radial direction, and
   the guide plate moves relative to the case in the first radial direction by causing the guided surfaces to come into contact with the guiding surfaces and to be slid.

8. The speed reducer according to claim 1,
   wherein the guide portion includes:
   a guide lug provided on the externally toothed gear wheel so as to protrude toward the guide plate parallel to the axis; and
   a guide groove provided in the guide plate by cutting out an end of the guide plate such that the guide lug is inserted into the guide groove.

9. The speed reducer according to claim 1,
   wherein the guide plate is formed of a resin material.

10. The speed reducer according to claim 1,
    wherein the reducer includes plural sets of the guide protrusions and the guide recesses, each of the sets including the guide protrusion and the guide recess as a set.

* * * * *